United States Patent [19]

Hermanni

[11] Patent Number: 4,924,050
[45] Date of Patent: May 8, 1990

[54] WIRE ELECTRODE FOR USE IN SPARK-EROSIVE CUTTING

[75] Inventor: Hans Hermanni, Sinn-Fleisbach, Fed. Rep. of Germany

[73] Assignee: Berkenhoff GmbH, Heuchelheim, Fed. Rep. of Germany

[21] Appl. No.: 328,866

[22] Filed: Mar. 27, 1989

[30] Foreign Application Priority Data

Mar. 26, 1988 [EP] European Pat. Off. ...... 88/104897.9

[51] Int. Cl.$^5$ .............................................. B23H 7/08
[52] U.S. Cl. .................................. 219/69.12; 72/286; 148/11.5 C
[58] Field of Search ................... 219/69.12, 69.15; 428/615, 655, 656, 658, 674; 148/11.5 C, 13.2, 130, 411, 434, 441; 72/47, 258, 280, 286

[56] References Cited

U.S. PATENT DOCUMENTS

| | | | |
|---|---|---|---|
| 4,280,857 | 7/1981 | Dameron, Jr. et al. | 72/286 |
| 4,341,939 | 7/1982 | Brifford et al. | 219/69.15 |
| 4,424,432 | 1/1984 | Kaneko et al. | 219/69.12 |
| 4,574,604 | 3/1986 | Vogel et al. | 148/11.5 C |
| 4,727,002 | 2/1988 | Inagaki | 148/411 |

FOREIGN PATENT DOCUMENTS

| | | | |
|---|---|---|---|
| 125944 | 9/1980 | Japan | 219/69.12 |
| 60-46809 | 3/1985 | Japan | 72/47 |
| 249528 | 12/1985 | Japan | 219/69.12 |
| 103731 | 5/1986 | Japan | 219/69.12 |
| 62-20858 | 1/1987 | Japan | 148/11.5 C |
| 218026 | 9/1987 | Japan | 219/69.12 |
| 645831 | 10/1984 | Switzerland | 219/69.12 |

*Primary Examiner*—Philip H. Leung
*Assistant Examiner*—Geoffrey S. Evans
*Attorney, Agent, or Firm*—Flynn, Thiel, Boutell & Tanis

[57] ABSTRACT

A wire electrode for spark-erosive cutting includes a core area and an outer coating. The wire electrode is reduced in cross section in order to achieve a high surface quality characteristic and a high strength characteristic, is subsequently diffusion annealed in an oxidizing atmosphere, is thereafter again reduced in cross section, is exposed to a recrystallizing annealing and is deformed to a final dimension. The wire electrode has, on the one hand, a very even, fine-granular structure and is, on the other hand, provided with a very even and dense surface, which assures an excellent spark transfer.

10 Claims, 2 Drawing Sheets

BASE WIRE,
COATED
ENLARGEMENT 500:1

DIFFUSION
ANNEALING
ENLARGEMENT 200:1

CALIBRATING
ENLARGEMENT 200:1

RECRYSTALLIZATION ANNEALING
ENLARGEMENT 250:1

FINAL DIAMETER
ENLARGEMENT 500:1

WIRE ELECTRODE FOR USE IN SPARK-EROSIVE CUTTING

CROSS REFERENCE TO RELATED APPLICATION

This invention is related to application Ser. No. 07/260 905, filed Oct. 21, 1988.

FIELD OF THE INVENTION

The invention relates to a wire electrode for use in spark-erosive cutting and, in particular, to a method for the manufacture of such a wire electrode having a core surrounded by an outer coat. The wire electrode, to which the invention relates, can be used very generally as an eroding electrode.

BACKGROUND OF THE INVENTION

In the spark-erosion method of operation, in particular during spark-erosive or electro-erosive cutting, a wire electrode is guided through the workpiece along a cutting area on a workpiece, that is, a cutting gap. A flushing of the cutting area by means of a dielectric fluid occurs in a conventional manner.

The basic principle of spark-erosive machining methods is to cause a current to sparkover intermittently between the workpiece and the electrode and cause metal particles of the workpiece to be removed. Since the current flows between the surface of the electrode, which is usually constructed in the form of a wire which is pulled continuously through the cutting area, and the workpiece, it is obvious that the results of spark-erosive machining depend extensively on the shape of the surface or topography of the electrode and the dimensions thereof. Since during spark-erosive machining not only the workpiece but also the electrode is removed, initial inexactnesses in the measurement of the electrode, in particular while it is guided through a thicker workpiece, are considerably increased. All of this results in a cut, in particular during spark-erosive cutting, not being able to be manufactured with the necessary precision and surface quality.

The basic purpose of the invention is to provide a wire electrode of the above mentioned type having a high surface quality, an even or steady electric transfer characteristic and a sufficient tensile strength characteristic.

SUMMARY OF THE INVENTION

The purpose is attained inventively by reducing in cross section the wire electrode in a first method step, by a diffusion annealing of the wire electrode in an oxidizing atmosphere in a subsequent second method step, by thereafter subjecting the wire electrode to a further reduction in cross section to an intermediate diameter in a third method step, by carrying out a recrystallizing annealing in a reducing atmosphere in a fourth method step, and by forming the wire electrode to a final diameter in a fifth method step.

The wire electrode manufactured according to the method of the invention is distinguished, compared with the state of the art, by a number of considerable advantages. The deformation of the wire electrode in the first method step makes it possible to carry out, to a suitable degree, a reduction in cross section of the wire in relationship to the diameter of the base material, with the degree of the reduction in cross section being determined by the selection of material for the wire electrode. During the subsequent diffusion annealing in an oxidizing atmosphere, an oxidation of the surface of the wire or of the wire electrode is carried out, with the thickness of the diffusion layer being able to be adjusted inventively to the utilized materials of the core and of the outer coat. The diffusion layer facilitates a building up of an edge layer which can have a greater thickness than the outer coat of the wire. It is possible through the construction of the oxidation layers to create harder surface layers or surface areas, which contribute to an increase in the cutting performance and the wear characteristics of the wire electrode. The annealed wire is, in a subsequent third method step, subjected to a further reduction in cross section to an intermediate diameter. The reduction in cross section is possible since the structure, at least partly during the diffusion annealing process, can reduce the rigidity or hardness created by the initial deformation process. It is basically not possible, or only conditionally possible, to plastically deform the diffusion layers produced in the second method step. A further reduction in cross section is, however, possible in the case of the inventive wire, since the core of the wire consists of a ductile material, which can furthermore be plastically deformed and into which the outer hard, principally nondeformable diffusion mixed crystals, which among others include $\beta$ and $\gamma$ and their mixed crystal phases, can be pressed.

During subsequent recrystallizing annealing in a reducing atmosphere, a structure of relatively coarse grains is constructed in order to facilitate, during the fifth and following method step, a further reduction in the diameter of the wire electrode to the final diameter.

The inventive wire electrode has a high degree of surface exactness, since irregularities in the wire surface, which can be caused by oxide particles or grains, are reliably overcome by the two deformation operations occurring after the oxidizing diffusion annealing and the interposed recrystallizing annealing. Furthermore, the inventive wire is distinguished by a high strength characteristic, in particular a high tensile strength, so that it is possible to guide the wire electrode in a spark-erosion machine while it is under a high mechanical tension during its passage through the workpiece. Both this measure and also the high surface quality and surface dimension of the inventive wire electrode makes it possible to make highly precise cuts.

The core material of the wire electrode is, in a preferred further development of the inventive method, manufactured of a copper or a copper-zinc-alloy. The outer coat can be manufactured either of a zinc or of a metal having a low volatilization temperature. For example, cadmium, bismuth, antimony or an alloy of one or several of these metals can be used in the latter case.

In carrying out the first method step, it is advantageous if the deformation is 40 to 70%, in relationship to the base or original cross section of the material. With this degree of deformation, it is assured that the core of the wire material still has a sufficient deforming capability in order to be able to be further deformed after oxidizing annealing in the second method step and to facilitate a compression of the harder mixed crystals and their oxide particles.

Annealing occurs preferably in the second method step within a temperature range of 454° to 902° C. utilizing electric resistance annealing methods, induction and radiation methods being particularly suited for the annealing treatment, since these, on the one hand, can be used in association with continuous annealing methods and, on the other hand, permit a particularly precise regulating of the annealing operation.

Furthermore, it has proven to be advantageous in the second method step to perform the annealing process over a time period which makes possible the construction or formation of a diffusion layer having a thickness of 100 to 500% of the thickness of the outer coat. If the outer coat or layer has a thickness of, for example 20 μm, it is preferable to construct or form the diffusion layer to a thickness of 40 to 100 μm.

The degree of deformation is, in the third step, preferably 40 to 70%. This deformation, on the one hand, effects a sufficient rigidity or hardness of the wire material and, on the other hand, it is possible to compress the oxides produced during diffusion annealing in a sufficient manner into the softer core material.

Recrystallizing annealing occurs preferably in the fourth method step at a temperature in the range of 600° to 850° C., with recrystallization being carried out preferably in an oven in a reducing atmosphere in order to recrystallize in particular the surface of the wire electrode.

In dependency of the desired final strength characteristic of the wire electrode, the degree of deformation performed in the fifth method step is 10 to 80% in relationship each to the underlying cross section of the wire electrode.

BRIEF DESCRIPTION OF THE DRAWINGS

The invention will be discussed in greater detail hereinbelow with reference to one exemplary embodiment and the accompanying drawings, in which.

DETAILED DESCRIPTION

Figure 1:
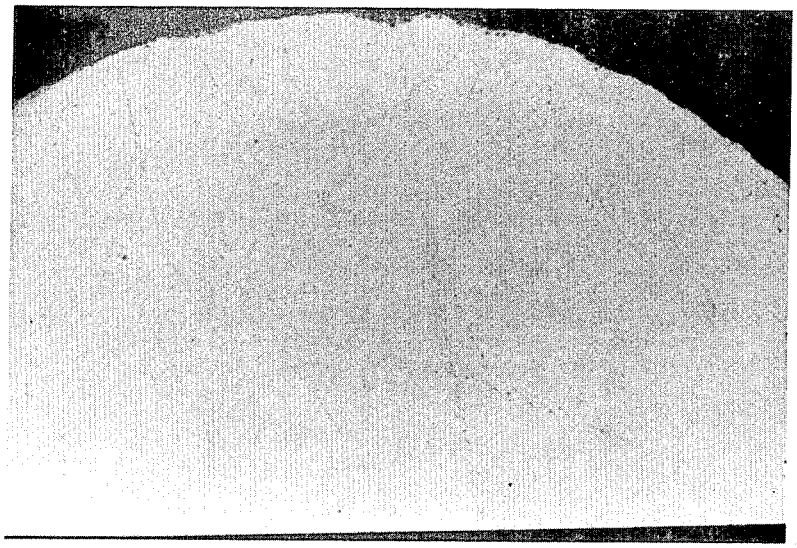
FIG. 1 is a cut view of the base material of the wire electrode.

FIG. 1 is an enlarged illustration of a cut sample of the base material used in the manufacture of the inventive wire electrode. The base material has a core, which is surrounded by a coating of zinc.

Figure 2:
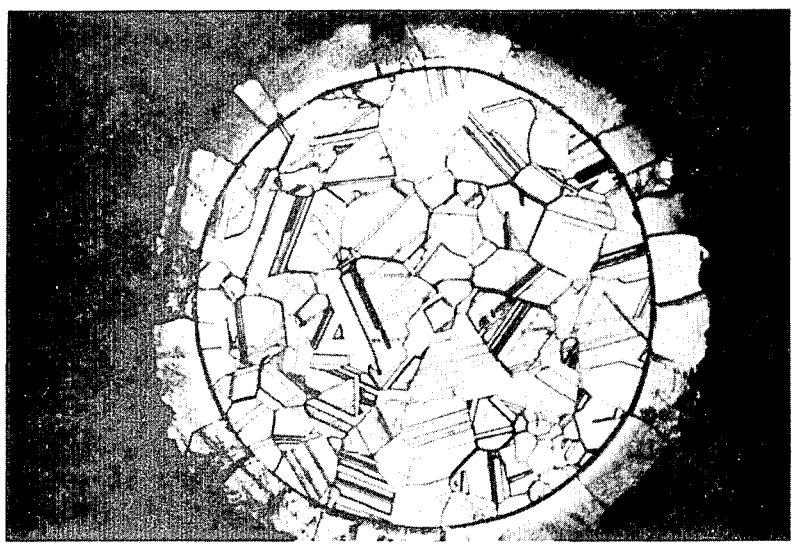
FIG. 2 is an enlarged illustration of a cut sample of the wire electrode after performing the second method step.

FIG. 2 is an illustration of a cut sample of the wire electrode after the first and the second method steps have been performed. The structure thus has already been reduced in cross section and has already been exposed to diffusion annealing in an oxidizing atmosphere.

Figure 3:
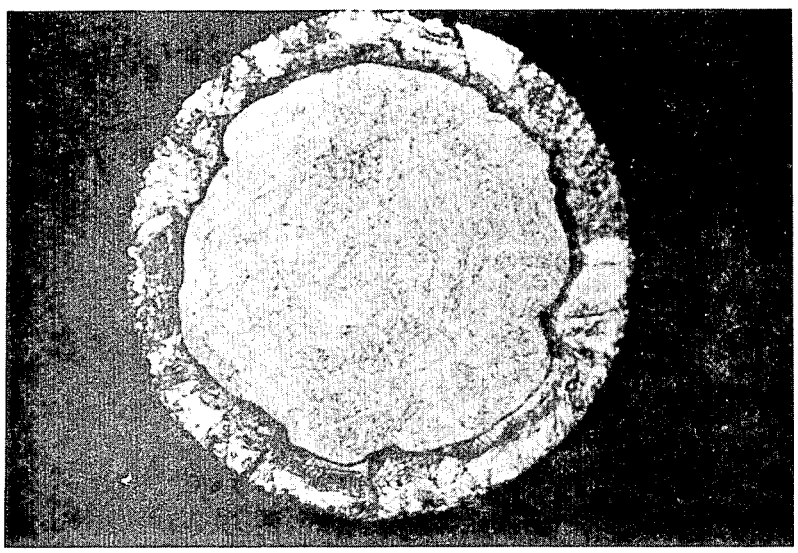
FIG. 3 is an illustration of a cut sample of the wire electrode after performing the third method step.

FIG. 3 is an illustration of a cut sample of the wire electrode after the third method step has been performed and after a further cross-sectional reduction has occurred, with the harder edge phases, produced during diffusion annealing in the second method step, having been compressed into the softer core material.

Figure 4:
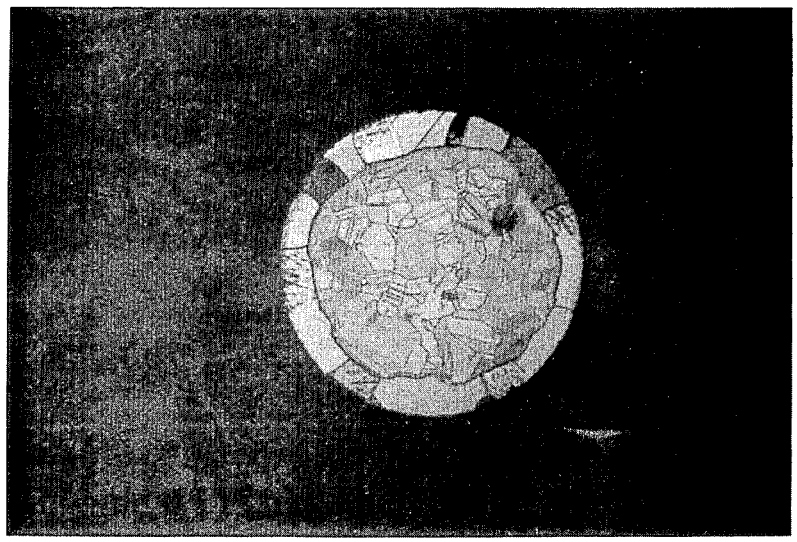
FIG. 4 is an illustration of a cut sample of the wire electrode after performing the fourth method step.

FIG. 4 is an illustration of a cut sample of the wire electrode after the fourth method step has been performed, that is, after recrystallizing annealing done in a reducing atmosphere, such as hydrogen. It can thereby be clearly recognized that the outer layer, namely the coating, has relatively large grains, which grew during recrystallization.

Figure 5:
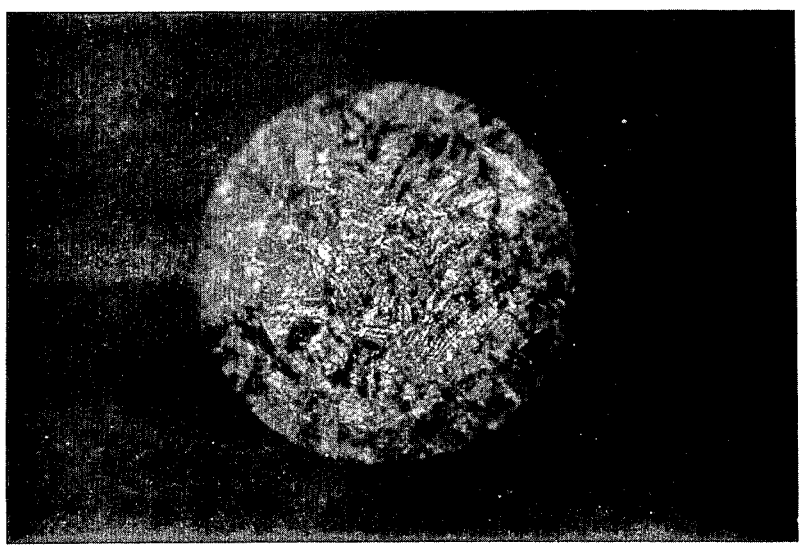
FIG. 5 is an illustration of a cut sample of the wire electrode after the fifth method step.

FIG. 5 illustrates a cut sample of the final state of the inventive wire electrode. It can be seen that the inventive wire electrode has a clearly defined outer coating and a core. A very even structure as a whole has been constructed or formed.

The inventive wire electrode is distinguished by a high degree of cutting exactness characteristic, a high strength characteristic, in particular a high tensile strength, all of which makes possible a comparably high cutting performance with a very small peak-to-valley height. All of these characteristics facilitate a high degree of exactness or precision in the shape of the workpieces erosion cut using the inventive wire electrode. Due to the re-shaping of the recrystallized structure, a very dense outer oxide-free structure is achieved which, due to its homogeneity and its density, assures a very even spark transfer. This, too, results in a considerable improvement in the surface quality of the cut workpieces.

A wire of the invention has advantageously a minimum tensile strength lying above 400 N/mm$^2$.

The embodiments of the invention in which an exclusive property or privilege is claimed are defined a follows:

1. A method for the manufacture of a wire electrode for use in spark-erosive cutting, with the wire electrode including a core surrounded by an outer layer, comprising reducing the wire electrode in cross section in a first step, subsequently diffusion annealing the wire electrode in an oxidizing atmosphere in a second step, subjecting the wire electrode to a further reduction in cross section to an intermediate diameter in a third step, recrystallizing annealing in a reducing atmosphere in a fourth step, and deforming the wire electrode to a final diameter in a fifth step.

2. The method according to claim 1, wherein the core of the wire electrode is a copper alloy or a copper-zinc alloy and that zinc is used as outer coating.

3. The method according to claim 1, wherein the core of the wire electrode is a copper alloy or a copper-zinc alloy and is provided with an outer coating of a metal having a low volatilization temperature, as, for example, cadmium, bismuth, antimony or an alloy of one or several of said metals.

4. The method according to claim 1, wherein the deformation in the first step is 40 to 70% in relationship to base cross section of the material.

5. The method according to claim 1, wherein annealing in the second method step occurs at a temperature in the range of 454° to 902° C.

6. The method according to claim 3, wherein annealing in the second method step takes place until a diffusion layer of 100 to 500% of the thickness of the outer coating is formed.

7. The method according to claim 1, wherein annealing in the second method step is one of an electric resistance annealing, induction and radiation annealing.

8. The method according to claim 1, wherein a deformation of 40 to 70% occurs in the third method step.

9. The method according to claim 1, wherein recrystallizing annealing in the fourth method step occurs at a temperature in the range of 600° to 850° C.

10. The method according to claim 1, wherein the deformation in the fifth method step is 10 to 80%.

* * * * *